United States Patent
Monaghan et al.

(10) Patent No.: US 6,764,663 B2
(45) Date of Patent: Jul. 20, 2004

(54) PROCESS FOR PRODUCING VANADYL/VANADOUS SULPHATE

(75) Inventors: Patrick Albert Monaghan, Witbank (ZA); Ivan Strydom, Witbank (ZA); Andries Gerhardus Dormehl, Middleburg (ZA)

(73) Assignee: Highveld Steel and Vanadium Corporation Limited, Witbank (ZA)

( * ) Notice: Subject to any disclaimer, the term of this patent is extended or adjusted under 35 U.S.C. 154(b) by 248 days.

(21) Appl. No.: 09/928,255

(22) Filed: Aug. 10, 2001

(65) Prior Publication Data

US 2003/0017102 A1 Jan. 23, 2003

(30) Foreign Application Priority Data

Jul. 18, 2001 (ZA) ............................................ 2001/5926
Aug. 2, 2001 (ZA) ............................................ 2001/6354

(51) Int. Cl.$^7$ ........................... C01G 31/00; C01B 17/96
(52) U.S. Cl. ............................ 423/62; 423/65; 423/67; 423/544; 429/205; 252/62.2; 205/496
(58) Field of Search ........................... 423/67, 65, 62, 423/544; 429/205; 205/496; 252/62.2

(56) References Cited

U.S. PATENT DOCUMENTS

| | | | |
|---|---|---|---|
| 4,039,582 A | * 8/1977 | Nasyrov et al. | 423/592 |
| 4,786,567 A | 11/1988 | Skyllas-Kazacos et al. | |
| 5,368,762 A | * 11/1994 | Sato et al. | 252/62.2 |
| 5,587,132 A | * 12/1996 | Nakajima et al. | 423/62 |
| 2002/0048546 A1 | * 4/2002 | Tanaka et al. | 423/544 |
| 2002/0119090 A1 | * 8/2002 | Tanaka et al. | 423/544 |

FOREIGN PATENT DOCUMENTS

| | | | |
|---|---|---|---|
| EP | 0 517 217 | 3/1997 | ............ H01M/8/18 |
| GB | 157555 | * 1/1919 | ................... 423/67 |

OTHER PUBLICATIONS

Mellor *A Comprehensive Treatise on Inorganic and Theoretical Chemistry vol. 1X* published by Longmans, Green & Co. Ltd. London GB, pp. 822 and 823, Sep. 1947.*
E. Sum et al: Investigation of the V(V) /V (IV) System for use in the Positive Half –Cell of a Redox Battery, *Journal of Power Sources, 16* pp. 85–95, 1985.
E. Sum et al.: A Study of the V(II)/V (III) Redox Couple for Redox Flow Cell Applications. *Journal of Power Sources, 15,* pp. 179–190, 1985.

* cited by examiner

Primary Examiner—Stanley S. Silverman
Assistant Examiner—Timothy C Vanoy
(74) Attorney, Agent, or Firm—Pauley Petersen & Erickson

(57) ABSTRACT

A process for preparing a reconstituted vanadyl sulphate/vanadous sulphate solution for use as an electrolyte in a vanadium redox battery is disclosed. The process includes preparing a starting material including a vanadyl sulphate/vanadous sulphate solution, evaporating the starting material by applying heat to form vanadyl sulphate/vanadous sulphate crystals, and re-dissolving the vanadyl sulphate/vanadous sulphate crystals with a volume of de-ionized water to form a reconstituted vanadyl sulphate/vanadous sulphate solution having substantially the same chemical composition at the starting material. A process for preparing a vanadyl sulphate/vanadous sulphate starting material from a vanadium bearing ore material, particularly a titaniferous magnetite ore material is also disclosed.

15 Claims, No Drawings

PROCESS FOR PRODUCING VANADYL/VANADOUS SULPHATE

BACKGROUND OF THE INVENTION

This invention relates to a process for the preparation of a vanadyl/vanadous sulphate crystal product or solution from a vanadium bearing ore material, and to various intermediate steps in the process.

Vanadyl/vanadous sulphate solutions or electrolytes are becoming more and more important in various applications, including in the battery industry. A problem with the solutions, however, is that they are highly acidic and hazardous. Accordingly, there may be serious problems in transporting these products around the world.

Additionally, there are many vanadium bearing ores that would be useful as a starting material for producing vanadyl/vanadous sulphate solutions. However, as far as we know, there is to date no commercially viable process for producing vanadyl/vanadous sulphate solutions from vanadium bearing one.

SUMMARY OF THE INVENTION

According to a first aspect of the invention, a process for the preparation of vanadyl/vanadous sulphate crystals from a vanadyl/vanadous sulphate solution, and subsequent reconstitution of the crystals to form a solution, comprises the step of:

1) providing a starting material in the form of a vanadyl/vanadous sulphate solution having a specified chemical composition.
2) evaporating the solution to crystallization by applying heat; and
3) re-dissolving the crystals by the addition of a specified volume of de-ionized water with constant stirring and, if necessary, with the addition of heat to form a clear solution having substantially the same chemical composition as the starting material.

The necessity of applying heat in step 3) is dependent on the evaporation in step 2). If the vanadyl/vanadous sulphate solution is evaporated at its boiling point, the water of crystallization is removed from the crystals and heat is required for dissolution of the crystals in step 3). If however, the vanadyl/vanadous sulphate solution is evaporated at below its boiling point, for instance below 90° C., the water of crystallization is not removed from the crystal structure and no heat is required for dissolution of the crystals in step 3).

The invention encompasses a process for the preparation of a vanadyl/vanadous sulphate solution from vanadyl/vanadous sulphate crystals by dissolving the crystals in a specified volume of de-ionized water with constant stirring, and, if necessary, with the addition of heat.

The vanadyl/vanadous sulphate solution is prepared by forming a vanadous sulphate solution from a vanadyl sulphate solution electrolyzed with sulphuric acid, and combining the vanadous sulphate solution with a further portion of vanadyl sulphate solution, preferably in equal volumes and/or concentrations, and if desired filtering the resultant solution and adding phosphoric acid as required.

The vanadyl sulphate solution is preferably formed by reacting sulphuric acid, diluted with de-ionized water as required, with vanadium pentoxide and oxalic acid under suitable reaction conditions.

The sulphuric acid solution preferably has a molarity of about 2.8 to about 8.5 depending upon the specified molar concentration of the vanadyl sulphate solution.

The oxalic acid is preferably pure oxalic acid, in particular 99% pure or greater.

The vanadium pentoxide is also preferably pure, in particular having a $V_2O_5$ content of 99.5% or greater.

The vanadyl sulphate solution produced may have any desired molar concentration, for example 2M, 4M up to a maximum of 6M.

The pure $V_2O_5$ is preferably produced by forming a slurry containing ammonium-poly-vanadate (APV), contacting the slurry with ammonia gas to precipitate out ammonium-meta-vanadate (AMV), and calcining the AMV in a kiln to form pure $V_2O_5$.

Ammonium sulphate is preferably added to assist in precipitating the AMV from the APV slurry.

The ammonia gas is preferably added to the slurry very slowly to completely dissolve the APV before crystallization of the AMV.

The APV is preferably produced from a titaniferous magnetite ore.

According to a further aspect of the invention, there is provided a process for producing a vanadyl/vanadous sulphate crystal product or solution from a vanadium bearing ore material, in particular a titaniferous magnetite ore starting material incorporating, as appropriate, one or more of the above method steps.

The invention also extends to the use of a vanadyl/vanadous sulphate solution produced according to any one or more of the above method steps or reconstituted from a vanadyl/vanadous sulphate crystal product produced according to any one or more of the above method steps as an electrolyte in a vanadium redox battery.

DETAILED DESCRIPTION OF THE PRESENTLY PREFERRED EMBODIMENTS

The crux of the invention is the crystallization and re-establishment of a vanadyl/vanadous sulphate solution to its original chemical composition, and also the use of a vanadium bearing ore material for producing the vanadyl/vanadous sulphate solution or crystals, particularly for use as an electrolyte in a vanadium redox battery.

For convenience, the invention will be described with regard to the successive process steps from a vanadium ore bearing material to the final vanadyl/vanadous sulphate solution or crystal product. It is to be understood that whilst the entire process itself forms an important aspect of the invention, certain of the individual steps in the overall process are also important aspects of the invention.

Further, for convenience, the invention will be described with regard to a titaniferous magnetite ore as starting material. It is to be understood that any appropriate vanadium bearing ore material can be used as starting material.

The process commences by oxidizing the titaniferous magnetite ore with an appropriate reagent such as, for example, sodium sulphate and/or sodium carbonate. The oxidized titaniferous magnetite ore is then calcined and the calcined product is leached to produce a pregnant solution containing sodium-meta-vanadate. The APV is precipitated from the pregnant solution at a low pH with the addition of ammonium sulphate.

The APV powder so produced typically has an equivalent $V_2O_5$ content of about 80%. The APV powder is dissolved in de-ionized water and contacted with ammonia gas ($NH_3$) to precipitate out ammonium-meta-vanadate (AMV). If necessary, ammonium sulphate is added to assist the precipitation of the AMV. The concentration of $V_2O_5$ aimed for in the solution when the APV is slurried in de-ionized water is typically from 40–60 g/l.

The addition of the ammonia gas to the APV slurry is monitored by measuring the pH of the solution. The addition of ammonia is controlled at a very slow rate to completely dissolve the APV before the precipitation of AMV. The ammonium gas addition is stopped when a pH of between 8.4 and 8.8 has been reached. Additional ammonium sulphate is added to complete the precipitation process.

The AMV is de-ammoniated in an appropriate kiln to produce a pure $V_2O_5$ powder.

The reaction proceed as follows:

$$APV + NH_3 + H_2O \rightarrow AMV \rightarrow V_2O_5$$

The next step in the process is to produce a vanadyl sulphate solution with a specified molar concentration from a pure $V_2O_5$ powder, preferably that produced in the process described above. It is known to produce vanadyl sulphate by dissolving vanadium pentoxide in hot dilute sulphuric acid under vigorous agitation and continued heating with the aid of sulphur dioxide as the reducing agent. However, the limited solubility of sulphur dioxide in acidic and aqueous solutions results in the emission of sulphur dioxide from the solution and this presents an environmental hazard. Overdosing of the solution with $SO_2$ gas results in the unwanted formation of the lower valency vanadium sulphate $V_2(SO_4)_3$ and not vanadyl sulphate ($VOSO_4$). Further, since the dissolution of vanadium pentoxide in sulphuric acid is endothermic, heat has to be provided to drive the formation of vanadyl sulphate.

We have previously described in our co-pending application SA 2001/5584 a process for the preparation of a vanadyl sulphate solution with a specified molar concentration comprising mixing vanadium pentoxide ($V_2O_5$) and vanadium trioxide ($V_2O_3$) in substantially equal quantifies of vanadium in the starting materials and adding a predetermined volume of sulphuric acid solution having a predetermined molar concentration.

In an alternative process, it has now been found that a vanadyl sulphate solution with a specified molar concentration can be prepared by providing a first starting material in the form of sulphuric acid diluted with de-ionized water as required, a second starting material in the form of a chemically pure oxalic acid, and a third starting material containing pure vanadium pentoxide ($V_2O_5$).

The sulphuric acid solution preferably has a molarity of 2.8 to 8.5 depending upon the specified molar concentration of the vanadyl sulphate solution.

The second starting material is substantially pure oxalic acid typically 99% oxalic acid or purer.

The vanadium pentoxide preferably has a purity of about 99.5% or greater. As such a product can be produced by the process described above, the titaniferous ore material can be used as a starting material for producing such a vanadyl sulphate solution.

Due to the mixture of the concentrated sulphuric acid solution with a specified volume of de-ionized water, the process is exothermic at the start of the dissolution step to trigger the reaction.

The vanadyl sulphate solution produced may have any desired molar concentration, for example 2M, 4M up to a maximum of 6M.

The reaction proceeds as follows:

$$V_2O_5 + H_2C_2O_4 + 2H_2SO_4 \rightarrow 2VOSO_4 + 2CO_2\uparrow + 3H_2O$$

The advantages of this aspect of the invention are that firstly no external heat is required to trigger the dissolution, and secondly the oxalic acid is more user friendly than sulphur dioxide.

The next step in the process is to produce a vanadyl/vanadous sulphate solution or electrolyte. The vanadyl sulphate solution, preferably prepared according to the process described above is introduced to the anodic side of an electrolytic cell. The cathodic side of the cell contains a 4.6 molar sulphuric acid solution. The two solutions are separated by an ion selective membrane. Graphite electrodes are positioned on both sides of the membrane as close as possible to the membrane. A direct current is forced through both electrolytes. Continuous stirring is required to ensure that minimum polarization occurs. The vanadyl sulphate solution is typically circulated from a holding tank to the anodic side of the cell to prevent heat build-up. A multvolt reading is monitored continuously and the direct current is discontinued when the reading reaches −250 mV.

The vanadous sulphate solution formed is allowed to cool to ambient temperature and then filtered through a 5 micron cotton fibre filter. After filtering, a make-up volume of de-ionized water is added to provide a specific molarity. An equivalent vanadyl sulphate solution is made up to a specified molarity as described above. It too is filtered whereafter equivalent volumes and concentrations of vanadyl and vanadous sulphate solutions are mixed together to form a vanadyl/vanadous sulphate solution. The resulting solution is filtered and phosphoric acid added as per requirements.

As mentioned previously, there is a problem with transporting vanadyl/vanadous sulphate solutions due to their hazardous nature. Accordingly, the next step in the process is to crystallize the vanadyl/vanadous sulphate solution to produce crsytals that are capable of being restored to the original liquid state without any changes in the chemical composition.

The steps in this aspect of the invention include providing a starting material of vanadyl/vanadous sulphate solution with a specified chemical composition. In particular, an electrolyte produced in accordance with the process described above, evaporating the solution to crystallization by applying heat, and re-dissolving the crystals by the addition of a specified volume of pure de-ionized water with constant stirring and the addition of heat where necessary.

The evaporation of the vanadyl/vanadous sulphate solution dictates the reconstitution thereof. Thus, if the vanadyl/vanadous sulphate solution is crystallized by applying heat to boiling point, the water of crystallization is removed from the crystals and heat is required for dissolution of the crystals during the reconstitution of the solution. Where heat is applied to below boiling point, such as below 90° C. for example, the water of crystallization is not removed from the crystal structure. Accordingly, heat is not required when a specified volume of de-ionized water is added for reconstitution. However, care must be taken using this version of the process as the fine crystals are very hygroscopic.

Once the vanadyl/vanadous sulphate crystals have been formed, they are suitable for transportation with little or no environmental risk. Further, the crystals can be handled with greater ease. When they reach their desired location, they can be re-dissolved to form the solution having substantially the same chemical composition as the original vanadyl/vanadous sulphate solution by adding a specified volume of de-ionized water under appropriate conditions as described above.

In light of the above, it should be evident that not only does this invention provide an appropriate means for treating vanadyl/vanadous sulphate solutions for transportation, but also it provides for their production from a vanadium bearing ore starting material. Accordingly, it is possible to provide an appropriate electrolyte for a vanadium redox battery from a vanadium bearing ore starting material.

We claim:

1. A process for preparing a reconstituted vanadyl sulphate/vanadous sulphate solution comprising the steps of:
   1) forming a starting material of a vanadyl sulphate/vanadous sulphate solution;
   2) evaporating the vanadyl sulphate/vanadous sulphate solution by applying heat, forming vanadyl sulphate/vanadous sulphate crystals; and
   3) re-dissolving the vanadyl sulphate/vanadous sulphate crystals by adding a volume of de-ionized water with constant stirring to form a clear reconstituted vanadyl sulphate/vanadous sulphate solution having substantially the same chemical composition as the starting material.

2. The process according to claim 1, wherein the vanadyl sulphate/vanadous sulphate solution is evaporated at its boiling point in step 2) and heat is applied for dissolution of the vanadyl sulphate/vanadous sulphate crystals in step 3).

3. The process according to claim 1, wherein the vanadyl sulphate/vanadous sulphate solution is evaporated below its boiling point in step 2) and no heat is required for dissolution of the vanadyl sulphate/vanadous sulphate crystals in step 3).

4. A process according to claim 1, wherein the vanadyl sulphate/vanadous sulphate solution is prepared by forming a vanadous sulphate solution from a vanadyl sulphate solution electrolyzed with sulphuric acid, and combining the vanadous sulphate solution with a further portion of vanadyl sulphate solution.

5. A process according to claim 4, wherein the vanadous sulphate solution and the further portion of vanadyl sulphate solution are combined in at least one of equal volumes and equal concentrations.

6. A process according to claim 5, wherein the vanadyl sulphate solution is formed by diluting sulphuric acid, with de-ionized water to form a sulfuric acid solution and adding vanadium pentoxide and oxalic acid to the sulfuric acid solution.

7. A process according to claim 6, wherein the sulphuric acid solution has a molarity of about 2.8 to about 8.5.

8. A process according to claim 6, wherein the oxalic acid is at least 99% pure.

9. A process according to claim 6, wherein the vanadium pentoxide has a $V_2O_5$ content of at least 99.5%.

10. A process according to claim 9, wherein the $V_2O_5$ is produced by forming a slurry containing ammonium-poly-vanadate (APV), contacting the slurry with ammonia gas to precipitate out ammonium-meta-vanadate (AMV), and converting the AMV in a kiln to form $V_2O_5$.

11. A process according to claim 10, wherein ammonium sulphate is added to assist in precipitating AMV from the APV slurry.

12. A process according to claim 10, wherein the ammonia gas is added to the slurry at a rate effective to dissolve the APV before crystallization of the AMV.

13. A process according to claim 12, wherein the APV is produced from a titaniferous magnetite ore.

14. A process for producing a reconstituted vanadyl sulphate/vanadous sulphate solution from a vanadium bearing ore material comprising the steps of:
   calcining the vanadium bearing ore material together with a reagent to form a calcine containing vanadium components;
   leaching the vanadium components from the calcine to form a vanadium solution;
   precipitating ammonium-poly-vanadate (APV) from the vanadium solution;
   converting the APV to ammonium-meta-vanadate (AMV);
   converting the AMV to vanadium pentoxide;
   mixing sulphuric acid with de-ionized water to form a sulfuric acid solution;
   adding the vanadium pentoxide and oxalic acid to the sulfuric acid solution to form a vanadyl sulphate solution;
   electrolyzing a portion of the vanadyl sulphate solution with sulfuric acid to form a vanadous sulphate solution;
   mixing the vanadous sulphate solution with a portion of the vanadyl sulphate solution to form an intermediate vanadyl sulphate/vanadous sulfate solution;
   evaporating the intermediate vanadyl sulphate/vanadous sulphate solution by applying heat to form a vanadyl sulphate/vanadous sulphate crystal product; and
   dissolving the vanadyl sulphate/vanadous sulphate crystal product with an amount of de-ionized water to form a reconstituted vanadyl sulphate/vanadous sulphate solution having the same chemical composition as the intermediate vanadyl sulphate/vanadous sulphate solution.

15. A process according to claim 14, wherein the vanadium bearing ore material is a titaniferous magnetite ore.

* * * * *